United States Patent
Krause et al.

(10) Patent No.: US 8,713,925 B2
(45) Date of Patent: May 6, 2014

(54) SLIDING SEAT AND EXHAUST GAS TREATMENT FACILITY

(75) Inventors: Michael Krause, Albershausen (DE); Arthur Wieland, Wolfschlugen (DE); Georg Wirth, Kirchheim/Teck (DE); Kresimir Jambrosic, Stuttgart (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 642 days.

(21) Appl. No.: 12/337,035

(22) Filed: Dec. 17, 2008

(65) Prior Publication Data

US 2009/0158720 A1 Jun. 25, 2009

(30) Foreign Application Priority Data

Dec. 24, 2007 (DE) .......................... 10 2007 062 662

(51) Int. Cl.
*F01N 13/08* (2010.01)
(52) U.S. Cl.
USPC .................. 60/322; 60/286; 60/295; 60/297; 60/301; 60/311
(58) Field of Classification Search
USPC ........... 60/286, 299, 302, 322, 323, 295, 297, 60/301, 311
See application file for complete search history.

(56) References Cited

U.S. PATENT DOCUMENTS

| | | | | |
|---|---|---|---|---|
| 2,217,664 A | * | 10/1940 | Berger | 285/224 |
| 4,565,380 A | * | 1/1986 | Newman et al. | 277/616 |
| 5,094,073 A | * | 3/1992 | Worner et al. | 60/299 |
| 5,111,561 A | * | 5/1992 | Nakagawa et al. | 29/4.55 |
| 5,145,215 A | * | 9/1992 | Udell | 285/49 |
| 5,173,267 A | * | 12/1992 | Maus et al. | 422/179 |
| 5,190,732 A | * | 3/1993 | Maus et al. | 422/179 |
| 5,506,376 A | | 4/1996 | Gödel | |
| 5,907,134 A | * | 5/1999 | Nording et al. | 181/228 |
| 6,131,960 A | * | 10/2000 | McHughs | 285/302 |
| 6,265,078 B1 | * | 7/2001 | Atmur et al. | 428/446 |
| 6,660,359 B1 | * | 12/2003 | Wirth et al. | 428/108 |
| 7,051,523 B2 | * | 5/2006 | Kerchner | 60/322 |
| 7,323,030 B2 | * | 1/2008 | Andersen et al. | 55/502 |
| 2004/0139741 A1 | * | 7/2004 | Balle et al. | 60/322 |
| 2005/0241303 A1 | * | 11/2005 | Nording et al. | 60/323 |
| 2006/0153748 A1 | * | 7/2006 | Huthwohl et al. | 422/172 |
| 2006/0156712 A1 | * | 7/2006 | Buhmann et al. | 60/297 |
| 2006/0213187 A1 | * | 9/2006 | Kupe et al. | 60/286 |
| 2007/0009402 A1 | * | 1/2007 | Wirth et al. | 422/179 |
| 2007/0071656 A1 | * | 3/2007 | Wirth et al. | 422/180 |
| 2008/0314033 A1 | * | 12/2008 | Aneja et al. | 60/297 |

FOREIGN PATENT DOCUMENTS

| | | |
|---|---|---|
| DE | 39 22 667 A1 | 9/1990 |
| DE | 92 05 294 U1 | 6/1992 |
| DE | 43 18 343 A1 | 12/1994 |
| DE | 199 18 301 C1 | 10/2000 |
| DE | 101 05 841 C2 | 8/2002 |

(Continued)

*Primary Examiner* — Thomas Denion
*Assistant Examiner* — Jorge Leon, Jr.
(74) *Attorney, Agent, or Firm* — Reinhart Boerner Van Deuren P.C.

(57) ABSTRACT

The present invention relates to a sliding seat for mounting a thermally impacted pipe on a structural part so as to be axially movable, in particular in an exhaust gas system of a combustion engine, with a bearing material which is radially supported against pipe on the outside thereof and which is fixed on structural part via a retaining pipe fastened on structural part.

20 Claims, 6 Drawing Sheets

(56) References Cited

FOREIGN PATENT DOCUMENTS

| DE | 10 2004 021 474 B3 | 3/2005 |
|---|---|---|
| DE | 103 34 307 A1 | 3/2005 |
| EP | 0 537 603 A1 | 4/1993 |
| EP | 0 580 963 A1 | 2/1994 |
| EP | 1 329 608 A2 | 7/2003 |
| GB | 2 278 901 A | 12/1994 |
| JP | 6159823 A | 6/1994 |
| JP | 6159824 A | 6/1994 |
| JP | 2007-218221 | 8/2007 |

* cited by examiner

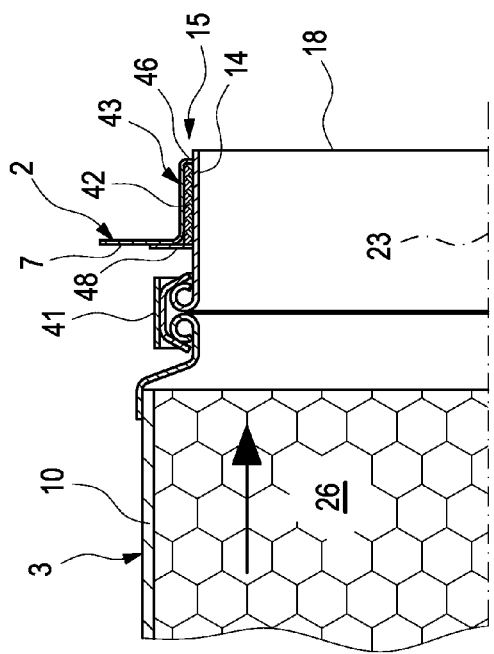
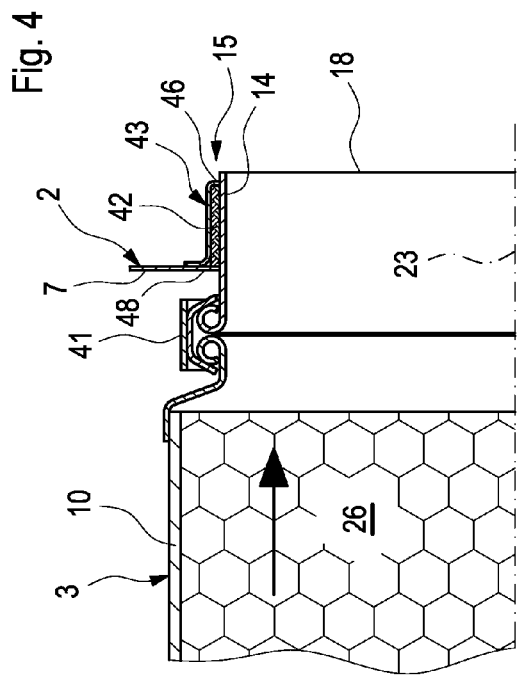
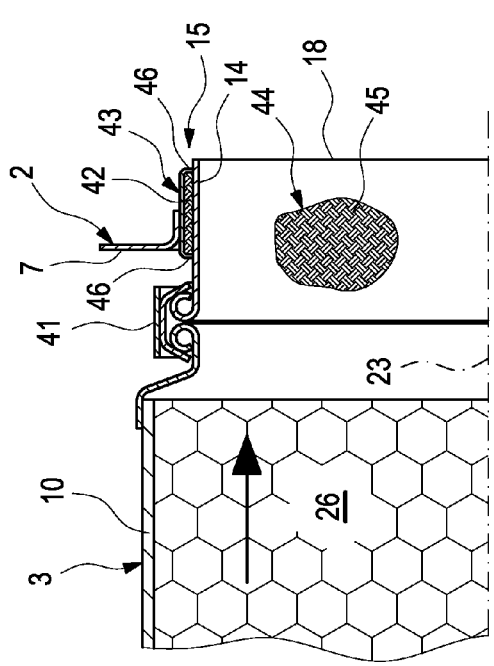
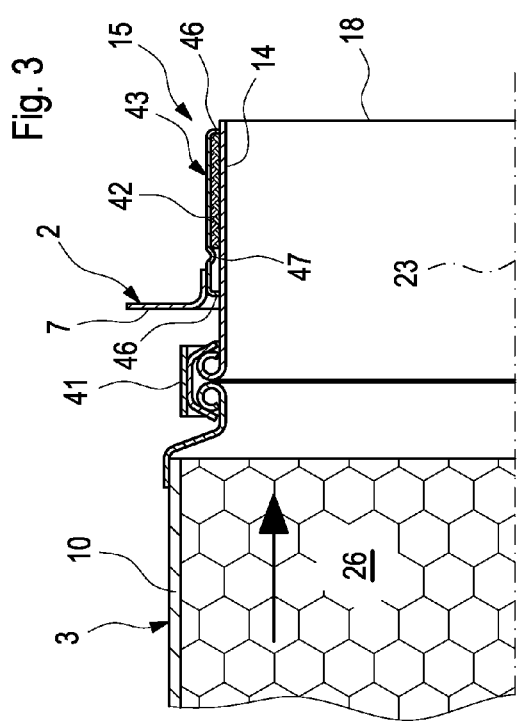

SLIDING SEAT AND EXHAUST GAS TREATMENT FACILITY

CROSS-REFERENCE TO RELATED PATENT APPLICATIONS

This patent application claims the benefit of co-pending German Patent Application No. DE 102007062662.4, filed Dec. 24, 2007, the entire teachings and disclosure of which are incorporated herein by reference thereto.

FIELD OF THE INVENTION

The present invention relates to a sliding seat for mounting a thermally impacted pipe on a structural part so as to be axially movable, in particular in an exhaust system of a combustion engine. The invention also relates to an exhaust gas treatment facility with such a sliding seat.

BACKGROUND OF THE INVENTION

In order to be able to permanently fasten thermally impacted pipes on a support, it is common to mount the respective pipe on the support using a fixed bearing on the one hand, and a movable bearing on the other, thereby allowing the length of the pipe to change relative to the support without inadmissibly high stresses occurring between pipe and support. Movable bearings of this kind may be realised using so-called sliding seats, where the pipe sits in a locating opening formed in the respective support, in such a way that the pipe is axially displaceable relative to its longitudinal axis.

Thermally impacted pipes, which are mounted on a structural support part by means of a sliding seat, are employed in many areas of the art, in particular in those areas where hot or cold fluids are conveyed in pipes. This problem occurs, for example, in heating systems, cooling systems and exhaust gas systems. Exhaust gas systems are found in heating devices and in combustion engines, preferably in motor vehicles. For example, an exhaust gas treatment facility may include at least one pipe which is mounted in a housing of the exhaust gas treatment facility with the aid of such a sliding seat. An exhaust gas treatment facility may, for example, be a particle filter, a converter or a sound absorber or any combination of such facilities.

A conventional sliding seat may have a certain amount of radial play between the pipe and the respective locating opening in order to allow the pipe to be displaced in the seat more easily. This is unfavourable for applications which require a certain gas-tightness because it is, in principle, possible for a gas exchange to take place through the sliding seat. Tighter environmental protection standards require that on exhaust gas systems, in particular, an escape of exhaust gas into the environment, for example through a sliding seat, must be avoided.

Furthermore conventional sliding seats, in principle, suffer from the problem of a comparatively high mechanical load on the pipe or the respective structural support part within the sliding seat. Mechanical loads are connected with wear and may lead to the development of background noise.

BRIEF SUMMARY OF THE INVENTION

Embodiments of the present invention address the problem of specifying an improved embodiment for a sliding seat or for an exhaust gas treatment facility, with which a sufficient sealing effect can be achieved in principle and/or which will reduce the mechanical load within the sliding seat.

Embodiments of the invention are based on the general idea to equip the respective sliding seat with a bearing material which, on the one hand, is mounted to the respective structural part with the aid of a coaxially enclosing retaining pipe and which on the other hand, is radially supported on the outside of the pipe. In operation, the pipe is able to slide along the bearing material when its length changes due to a thermal load. Since such a bearing material may have a certain elastic flexibility, the mechanical load of the pipe or the structural part within the sliding seat is reduced. At the same time it is possible to cushion or dampen radially orientated relative movements between pipe and structural part, which may arise due to vibrations when in operation. Associated noises may thereby be effectively reduced. In addition it is possible, in principle, to configure the respective bearing material with a tightness which will ensure sufficient sealing of the sliding seat. With this arrangement the retaining pipe, on the one hand, ensures axial guiding of the pipe thereby increasing the mechanical stability of the sliding seat. On the other hand, the retaining pipe allows bearing material to be used which in axial direction has comparatively large dimensions. This leads to an increase in the sealing effect and a reduction in the load on the bearing material when in operation.

Further important features and advantages of embodiments of the invention are disclosed in the sub-claims, the drawings and the associated description of the Figures by way of the drawings.

It is understood that the features mentioned above and explained in the following can be employed not only in the respectively specified combination but also in other combinations or on their own without deviating from the scope of the present invention.

Other aspects, objectives and advantages of the invention will become more apparent from the following detailed description when taken in conjunction with the accompanying drawings.

BRIEF DESCRIPTION OF THE DRAWINGS

Preferred embodiments of the invention are illustrated in the Figures and will be explained in detail in the following description, whereby identical reference symbols designate identical or similar or functionally identical structural parts. In the schematic drawings:

FIGS. 3 to 6 show substantially simplified enlarged representations of a pipe assembly in the area of a sliding seat, for various embodiments;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
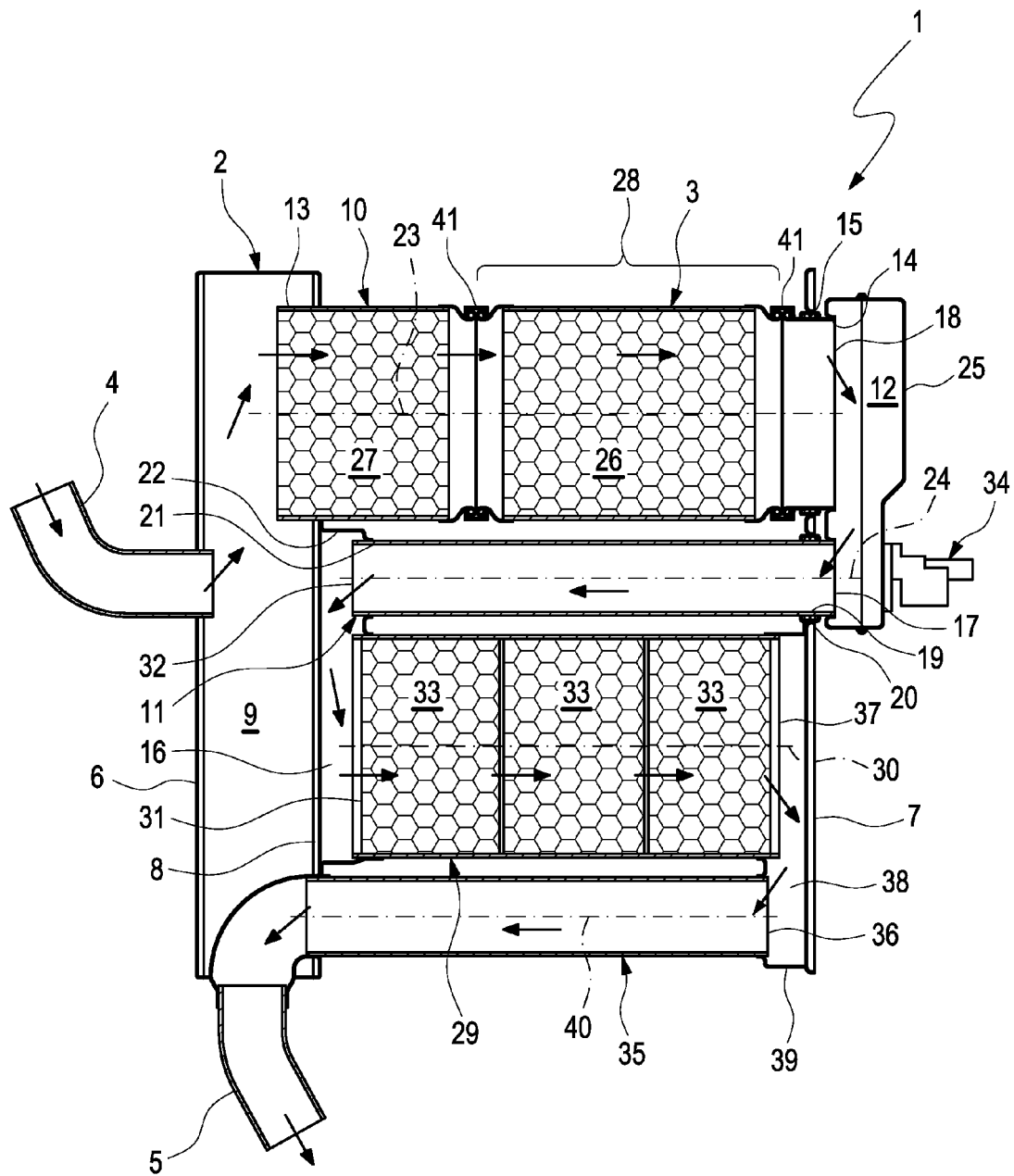
FIG. 1 shows a substantially simplified longitudinal section through an exhaust gas treatment facility.

Referring to FIG. 1, an exhaust gas treatment facility 1 comprises a housing 2 and at least one pipe assembly 3. The housing has at least one inlet 4 and at least one outlet 5. In the embodiment shown the housing 2 has two end floors 6 and 7 as well as an intermediate floor 8. The first end floor 6 and the intermediate floor 8 form the boundaries of an inlet chamber 9. Inlet 4, in the shape of an inlet pipe, is connected to the first end floor 6.

The pipe assembly 3 comprises at least two pipes communicating with each other, i.e. a first pipe 10 and a second pipe 11. The first pipe 10 communicates with the inlet chamber 9 on the entry side and with a redirecting chamber 12 on the exit side. The first pipe 10 is fastened, in an entry section 13, to a structural support part which is formed here by housing 2 or by a component part of housing 2, in this case by the intermediate floor 8. In an exit section 14, the first pipe 10 with a sliding seat 15 is also fixed on the structural support part, i.e. on housing 2, in particular on the second end floor 7. On the entry side, the second pipe 11 communicates with the redirecting chamber 12, and on the exit side, it communicates with a chamber 16 which can serve as a further redirecting chamber or as a distribution chamber. An entry 17 of the second pipe 11 communicates with an exit 18 of the first pipe 10 via the redirecting chamber 12. Since the redirecting chamber 12 communicatively connects the two pipes 10, 11 with each other, it may also be called connecting chamber 12 in the following. In an entry section 19, the second pipe 11 is now fixed with a sliding seat 20 on the structural support part, i.e. on housing 2, in particular on the second end floor 7. In addition, the second pipe 11 is also fastened on the structural support part, i.e. on housing 2, in an exit section 21. In the present case, housing 2 contains a shell body 22 for forming chamber 16 and the second pipe 11 is fastened to this shell body 22 in its exit section 21.

The first pipe 10 has a first longitudinal centre axis 23. The second pipe 11 therefore has a corresponding second longitudinal centre axis 24. In the embodiment shown, both longitudinal centre axes 23, 24 extend in parallel to each other. Both pipes 10, 11 pass through the respective floor 7 in separate openings.

In the embodiment shown here, the exit 18 of the first pipe 10 and the entry 17 of the second pipe 11 both openly lead into the connecting chamber 12. Connecting chamber 12 is formed here by one or more shell bodies 25 which are mounted on the exit section 14 of the first pipe 10 and on the entry section 19 of the second pipe 11. In an alternative embodiment, it is possible to have said shell bodies 25 mounted on the second end floor 7. In yet another possible embodiment, a suitably bent connecting pipe could be used instead of a connecting chamber 12 for connecting the two pipes 10, 11 with each other. Said connecting pipe would then connect the exit 18 of the first pipe 10 with the entry 17 of the second pipe 11.

The embodiment shown here represents an exhaust gas treatment facility 1, which may be employed in an exhaust gas system of a combustion engine, whereby this combustion engine may be arranged in a motor vehicle, preferably a commercial vehicle. The exhaust gas treatment facility 1 is configured here as a multi-functional facility and contains at least one particle filter element 26, which is disposed in the first pipe 10. In addition, the exhaust gas treatment facility 1 shown here comprises at least one oxidation converter element 27 which in this case is also disposed in the first pipe 10, conveniently upstream of the particle filter element 26. In addition, the exhaust gas treatment facility 1 may fulfill a sound absorber function.

Here the first pipe 10 has a radially removable axial section 28 identified by a curly bracket. Said axial section is fastened to the other sections of first pipe 10 by means of quick-fastening elements, for example in the form of clips or such like. To this end corresponding flanges may be formed with which the fastening elements 41 cooperate. The particle filter element 26 is conveniently disposed within the radially removable axial section 28. In this way, the respective particle filter element 26 is easy to replace or to exchange, for example. It is convenient if the entire unit is changed, comprised of axial section 28 and particle filter element 26 inserted therein.

In the example, a third pipe 29 is additionally provided the longitudinal centre axis 30 of which may also be arranged in parallel with longitudinal centre axes 23, 24 of the two other pipes 10, 11. An entry 31 of the third pipe 29 communicates with an exit 32 of the second pipe 11. In the example the second pipe 11 and the third pipe 29 lead into chamber 16, thereby constituting the communicative connection between the two pipes 11, 29. The third pipe 29 may contain at least one SCR converter 33. In the example, three such converter elements 33 are sequentially arranged in the third pipe 29. Using such a SCR converter 33 makes it possible to achieve a selective catalytic reduction of certain pollutants.

In the example, the exhaust gas treatment facility 1 also comprises a metering facility 34 with the aid of which a liquid educt can be introduced into the exhaust gas current. Conveniently ammonia or urea or preferably an aqueous urea solution may be introduced into the exhaust gas current with the aid of the metering facility 34. Using hydrolysis reaction urea can be used to produce ammonia. Ammonia can be used to convert nitrogen oxides to nitrogen. The corresponding reactions take place in the SCR converter 33, for example the converter element 33 through which the current initially flows can perform the hydrolysis whilst the following elements 33 convert ammonia.

The metering facility 34 may be arranged or configured in such a way that it always introduces the respective educt into the exhaust gas current upstream of the SCR converter 33. Conveniently nozzle injection takes place downstream of particle filter 26. In principle, educt may be injected into the redirecting chamber 12. Preferably, the metering facility 34 injects the educt into the entry section 19 of the second pipe 11. However, the educt may also be injected upstream of the second pipe 11. The second pipe 11 may be used as mixing section for exhaust gas and injected educt in order to ensure thorough mixing of the exhaust gas and the educt.

In the example illustrated, the exhaust gas treatment facility also comprises a fourth pipe 35 which leads to the outlet 5 or which is connected with outlet 5 configured as outlet pipe. An entry 36 of the fourth pipe 35 is communicatively connected with an exit 37 of the third pipe 29. This is achieved by a further redirecting chamber 38 which is realised using a shell body 39 and the second end floor 7. In this case also a longitudinal centre axis 40 of the fourth pipe 35 extends in parallel with the longitudinal centre axes 23, 24 of the first pipe 10 or the second pipe 11.

In the illustrated sectional view of exhaust gas treatment facility 1, only one first pipe 10, one second pipe 11, one third pipe 29 and one fourth pipe 35 are recognisable. It is clear that in special embodiments at least one of said pipes 10, 11, 29, 35 may be present several times over. For example, several second pipes 11 and/or several third pipes 29 may exist with SCR converters 33.

Figure 2:
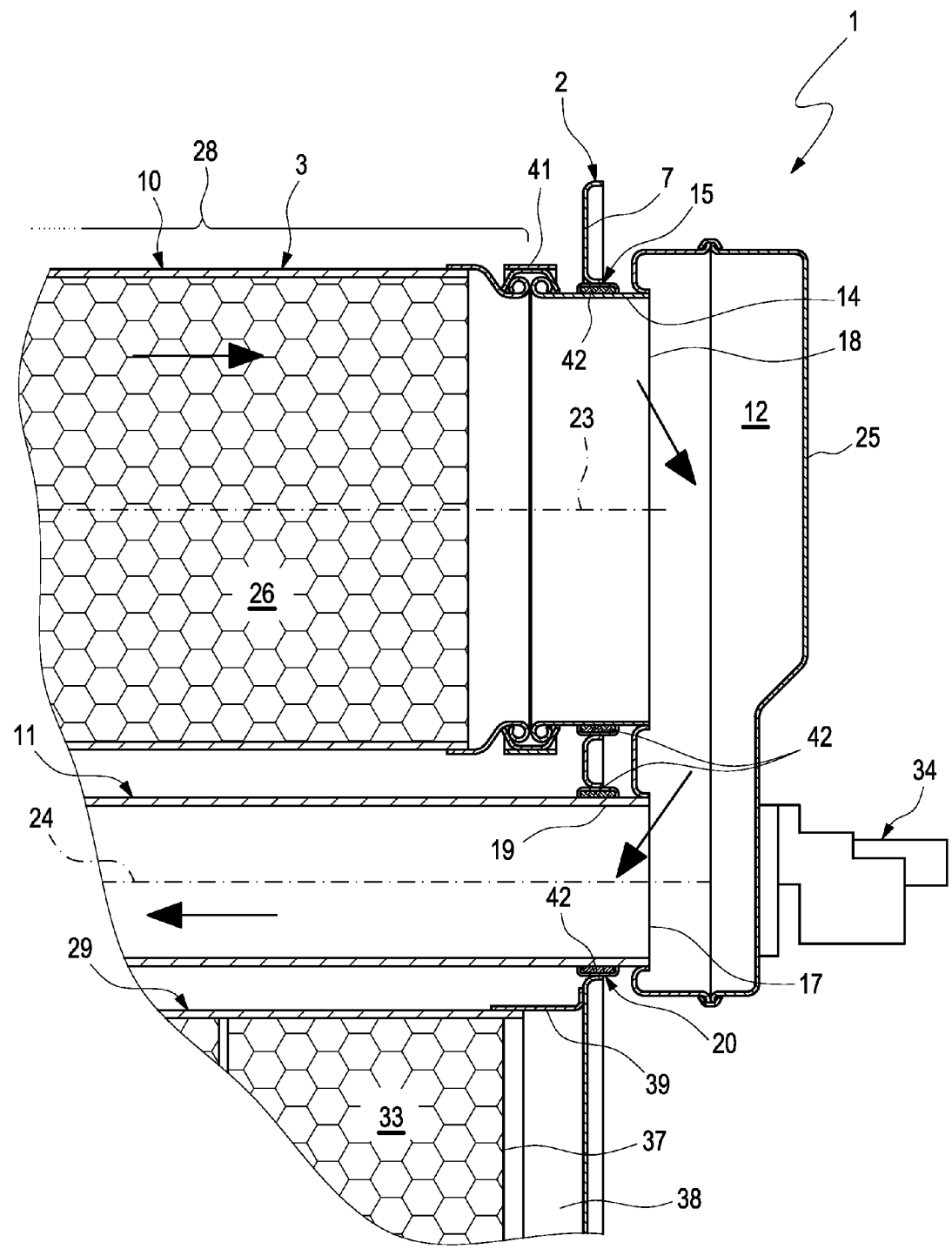
FIG. 2 shows an enlargement of a detail of the exhaust gas treatment facility in the area of a pipe assembly.

Referring to FIG. 2, the sliding seat 15 with which the first pipe 10 is mounted on the structural support part 2 or housing 2 comprises a bearing material 42. This bearing material 42 is fixedly disposed in relation to structural part 2, i.e. in relation to the housing 2, and is radially supported against the outside of first pipe 10. Therefore, pipe 10 can move in axial direction along bearing material 42. Bearing material 42 is itself fixed indirectly on housing 2.

In addition or alternatively, sliding seat 20, with which the second pipe 11 is mounted on the structural support part 2 or the housing 2, comprises a bearing material 42 which on the one hand, is radially supported on the outside of second pipe 11 and which is fixed indirectly on structural part 2 or housing 2.

Indirect fixing of the bearing material 42 on structural part 2 or housing 2 is accomplished in that the respective sliding seat 15 or 20 comprises a retaining pipe 43, as shown in FIGS. 3 to 6, which is fixedly arranged or formed on structural part 2 or housing 2, in this case on end floor 7 thereof. Retaining pipe 43 coaxially encloses the respective pipe 10 or 11. Retaining pipe 43 serves as radial and axial support for bearing material 42. Accordingly, bearing material 42 is arranged radially between retaining pipe 43 and the respective pipe 10, 11. Bearing material 42 completely encloses the respective pipe 10, 11 in circumferential direction. Bearing material 42 permits low-wear relative movements of the respective pipe 10, 11 in the sliding seat 15, 20 and in addition can ensure sufficient gas tightness. Furthermore, spaces existing, for example, in a sound absorber can be better utilised.

Bearing material 42 may, for example, be a fiber mat or a wire knit or any other elastic temperature-resistant material.

Fiber mats used could, for example, be bearing mats or insulating mats made of aluminium oxide fibers, mullite fibers, glass fibers or similar temperature-resistant fibers, which are characterised by sufficient elasticity and tightness as well as by a comparatively low friction value. Fiber mats of this kind are used, for example, for mounting monoliths in converters or particle filters. Insofar as the fiber mat comprises a weave with the fibers pointing in a defined direction, it may be convenient to mount the fiber mat in the retaining pipe 43 in such a way that the direction of its fibers is inclined in relation to the longitudinal centre axes 23, 24 of the respective pipe 10, 11 at least in one gliding zone supported against the pipe 10, 11. FIG. 3 shows purely schematically a cutout of the gliding zone designated 44 of the bearing mat designated 45. As can be seen, the fibers of fiber mat 45 extend at an angle of approx. 45° in relation to the longitudinal centre axis 23 or 24 of the pipe 10, 11.

If a wire knit is to be used as bearing material 42, this should be of a kind which is suitable for fixing a converter element in a converter housing. Such wire knits are characterised by a comparatively high temperature resistance and a certain elastic flexibility. The wire knit can help the respective seat 15 or 20 to radially fix the respective pipe 10, 11 whilst allowing axial relative movements between pipe 10, 11 and housing 2 or second end floor 7.

Basically, the wire knit may consist of several spaced-apart knitted cushions distributed in circumferential direction. With this arrangement the wire knit is composed of several parts, i.e. several separate knitted cushions. If, however, a certain tightness in sliding seat 15 or 20 is of paramount importance, the respective wire-knit is preferably configured in such a way that it consists of at least one knitted ring which surrounds the respective pipe 10, 11 in circumferential direction forming a closed ring. If several knitted rings are provided, these are conveniently arranged axially adjacent to each other.

Referring to FIGS. 3 and 5 to 8 the retaining pipe 43 is preferably a body which is manufactured separately from structural part 2 or housing 2. Accordingly retaining pipe 43 is mounted on housing 2 or structural part 2. Alternatively, as shown in FIG. 4, retaining pipe 43 may be an integral component part of the respective structural part 2, in this case of housing 2. Here, retaining pipe 43 is formed integrally with respective structural part 2.

Figure 7:
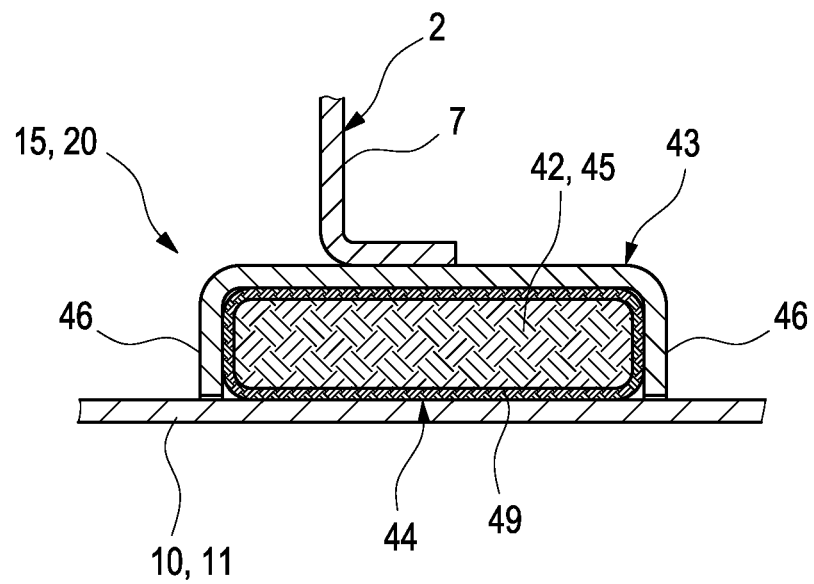
FIGS. 7 and 8 show substantially simplified enlarged representations of the sliding seat, for various embodiments.

According to the embodiments shown in FIG. 3 to 8 retaining pipe 43 may have at least one radially inwardly protruding collar 46 at one of its axial ends which collar is shaped integrally on retaining pipe 43. Collar 46 extending in circumferential direction may be closed or segmented. Its purpose is to axially support bearing material 42. In the embodiments of FIGS. 3, 5 and 7 as well as 8, such a collar 46 is formed at each axial end of retaining pipe 43.

In the embodiment shown in FIG. 5, a radially inwardly protruding bead 47 is integrally formed on retaining pipe 43 between its axial ends. This bead 47 also may extend in circumferential direction and be closed or segmented. The purpose of bead 47 also is to axially support bearing mat 42.

In the embodiments shown in FIGS. 4 and 6, a covering 48 is formed on an axial end of retaining pipe 43, which covering is used for axially supporting bearing material 42. The respective covering 48 protrudes radially inwardly in relation to retaining pipe 43. Covering 48 also may extend in circumferential direction and be closed or segmented. In the embodiment shown in FIG. 4 covering 48 is a separate structural part which is mounted on housing 2. In the embodiment shown in FIG. 6, covering 48 is shaped integrally on housing 2. To this end housing 2, in the example, has been radially inwardly extended in the area of its inner floor 7, such that it protrudes beyond retaining pipe 43.

The embodiments of the retaining pipe 43 shown here are to be understood purely as examples, not in any way as restrictions, so that it is possible, in principle, to use combinations of the illustrated embodiments as well as other embodiments not shown for realising retaining pipe 43.

Figure 8:
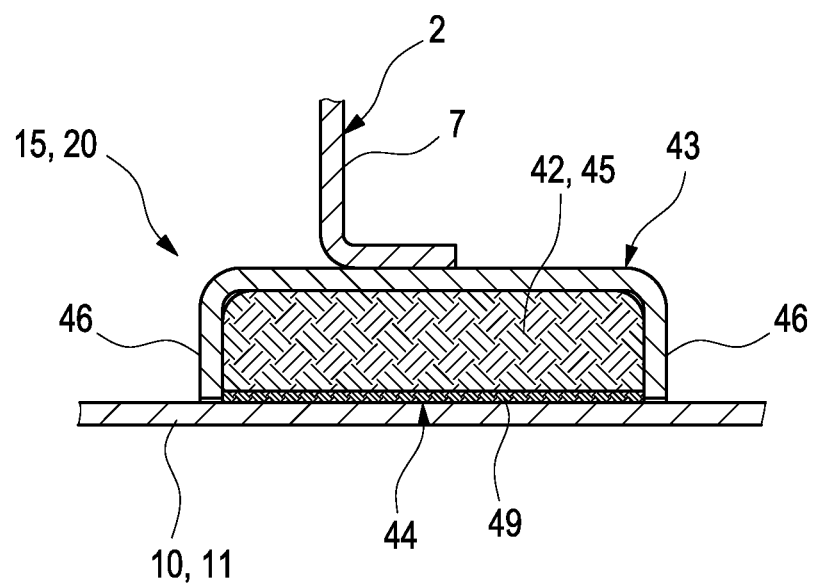

In FIGS. 7 and 8, gliding zone 44 of bearing material 42, which is supported against pipe 10, 11, is clearly recognisable. In the embodiments shown here, this gliding zone 44 at least is formed by a gliding weave 49 which is arranged on fiber mat 45 or bearing material 42 in a suitable way. With the embodiment shown in FIG. 7 the gliding weave 49 envelopes the fiber mat 45 like a tube. In contrast, FIG. 8 shows a layered construction where fiber mat 45 is supported against pipe 10, 11 via gliding weave 49. In this case, gliding weave 49 merely forms the radially inner gliding zone 44 of bearing material 42.

Gliding weave 49 may be formed of a glass fiber cloth and/or a ceramic fiber cloth. The gliding weave is characterised by reduced friction resistance such that wear in sliding seat 15, 20 can be reduced. The fiber orientation of fiber mat 45 described with reference to FIG. 3 analogously applies to gliding weave 49 insofar as this is provided for forming gliding zone 44.

In the fitted state, bearing material 42 may be pre-pressed or biased at least in radial direction in order to realise radially biased contacting between bearing material 42 and pipe 10, 11 in sliding seat 15, 20. For fitting, pipe 10, 11 respectively may comprise a cone at its end which is not shown.

Pipe 10, 11 may comprise a friction-reducing or wear-reducing outer surface at least in the area of sliding seat 15, 20. To this end, pipe 10, 11 may be manufactured from a correspondingly smooth material, such as cold-rolled plate, for example. The surface may be polished. Furthermore, a wear-reducing surface coating may be provided. The surface may be hardened and/or nitrided. In addition, a heat-resistant lubricant may be added to the respective sliding seat 15, 20, which is introduced into the bearing material 42, for example.

With regard to the bearing material 42, it is convenient to select the material and/or the dimensions so as match the expected heat expansion on pipe 10, 11 on one hand, and on housing 2 on the other, when in operation, so that sufficient thickness elasticity is always ensured in order to be able to always achieve sufficient radial pressure upon pipe 10, 11 and thus a sufficient sealing effect.

Figure 9:
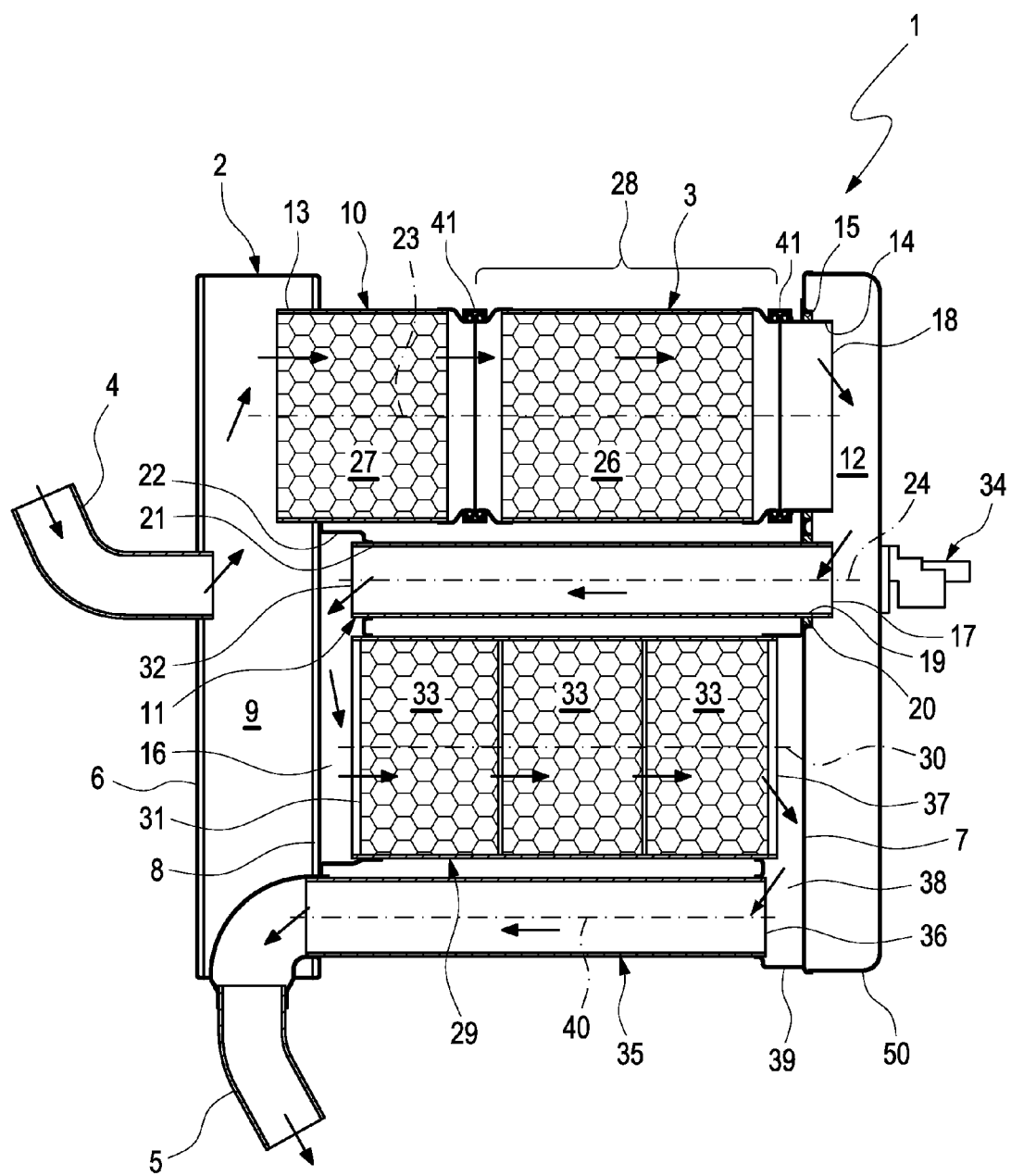
FIGS. 9 and 10 each show a longitudinal section similar to FIG. 1, but for other embodiments.

The embodiment shown in FIG. 9 differs from the embodiment shown in FIG. 1 only in that the redirecting chamber 12 extends across the entire height or side of the second end floor 7 or the exhaust gas treatment facility 1. This can cause counter-pressure to be reduced. To this end a shell-shaped lid body 50 is attached to the second end floor 7 so that redirecting chamber 12 is enclosed or limited by second end floor 7 and lid body 50. The difference in the embodiment shown in FIG. 1 consists in the fact that here shell-body 25 with redirecting chamber 12 enclosed or limited thereby, forms a separate structural part in relation to the second end floor 7.

Figure 10:
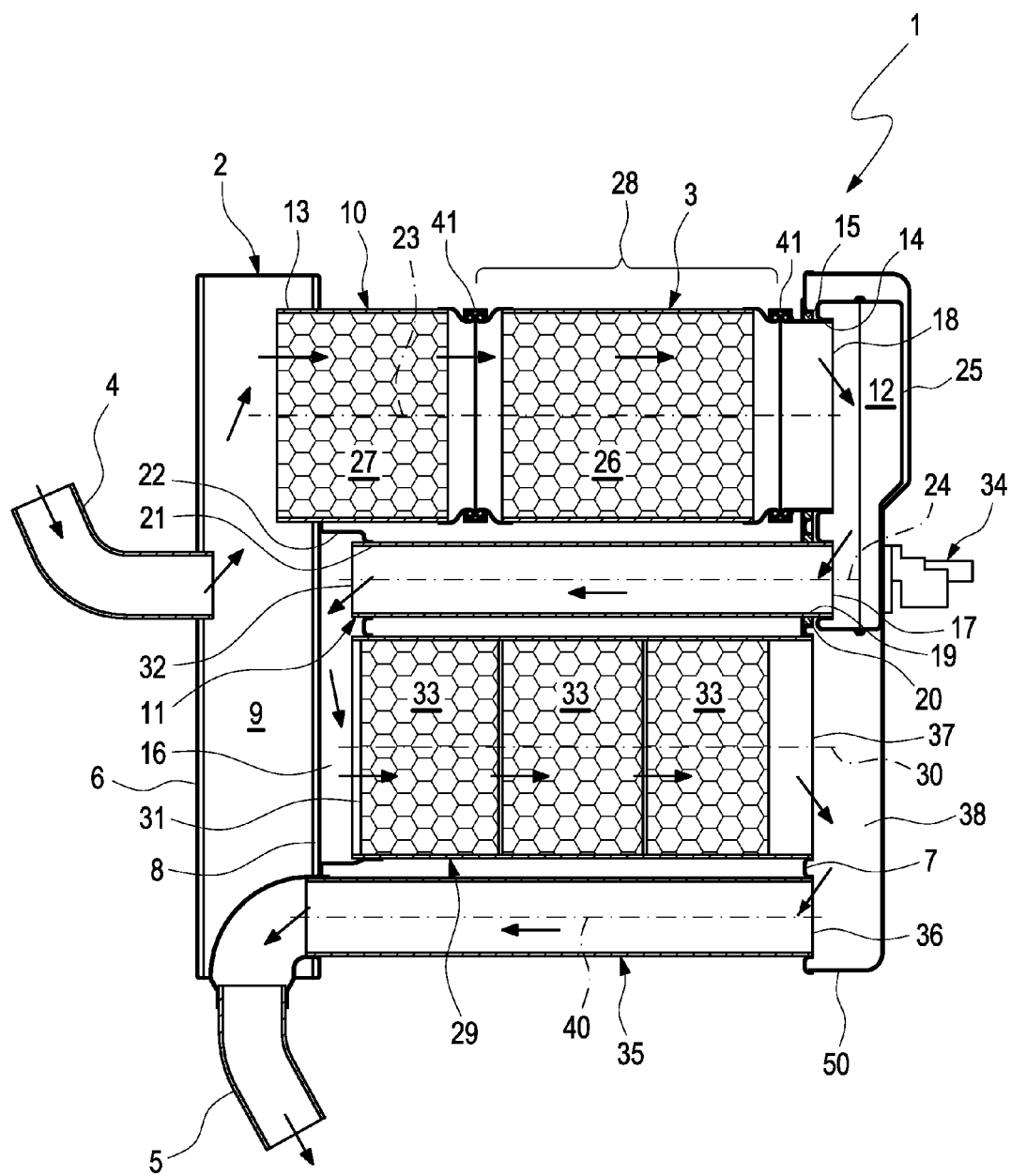

The embodiment shown in FIG. 10 provides for both the separate shell body 25 with respect to second end floor 7 for forming redirecting chamber 12 and the lid body 50 extending over the entire second end floor 7 and attached thereto. As a result, redirecting chamber 12 is double-chambered within the exhaust gas treatment facility 1, i.e. within the shell body 25 and within the lid body 50. The inside of shell-body 25 is separated from the inside of lid body 50 so as to be gastight. As a result, lid body 50 together with second end floor 7 may form the space or the chamber 38 which redirects the exhaust gas from third pipe 29 into fourth pipe 35. With this type of construction, the other shell body 39 may be omitted, which in the embodiments of FIGS. 1 and 9 form or enclose the said redirecting space 38.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An exhaust gas treatment facility for an exhaust gas system of a combustion engine, comprising:
   a housing having at least one inlet and at least one outlet;
   at least one pipe mounted with a sliding seat on the housing serving as a structural part or mounted on a component part of the housing serving as a structural part, wherein:
   a pipe assembly is provided comprising at least two pipes communicating with each other;
   a first pipe is fastened on the housing in an entry section of the first pipe, wherein the first pipe contains at least one particle filter element;
   the first pipe is fixed with a sliding seat on the housing in an exit section of the first pipe;
   a second pipe, the entry of which is connected with an exit of the first pipe, is fixed on the housing with a sliding seat in an entry section of the second pipe;
   the second pipe is fastened on the housing in an exit section of the second pipe without a sliding seat such that the exit section of the second pipe is fixedly attached to the housing; and
   wherein at least one of the sliding seats comprises a retaining pipe fixedly arranged or formed on the structural part, which retaining pipe coaxially encloses the first or the second pipe, and a bearing material coaxially arranged between the first or the second pipe and the retaining pipe, which the bearing material completely encloses the first or the second pipe in circumferential direction and which is supported radially on the first or the second pipe and radially and axially on the retaining pipe, whereby the housing or a component part of the housing forms the structural part; and
   wherein a connecting chamber is provided, into which openly lead the exit of the first pipe and the entry of second pipe such that the first and second pipe each extend through a common wall of the housing and into the connecting chamber.

2. The exhaust gas treatment facility of claim 1, wherein the first pipe contains at least one oxidation converter element.

3. The exhaust gas treatment facility of claim 1, wherein the first pipe has a radially removable axial section.

4. The exhaust gas treatment facility of claim 3, wherein the radially removable axial section contains at least one particle filter element.

5. The exhaust gas treatment facility of claim 1, wherein a third pipe is provided the entry of which is communicatively connected with an exit of the second pipe.

6. The exhaust gas treatment facility of claim 5, wherein the third pipe contains at least one SCR converter.

7. The exhaust gas treatment facility of claim 5, wherein a fourth pipe is provided, an entry of which is communicatively connected with an exit of the third pipe.

8. The exhaust gas treatment facility of claim 7, wherein the fourth pipe leads to an outlet.

9. The exhaust gas treatment facility of claim 1, wherein a metering facility for introducing a liquid educt is provided.

10. The exhaust gas treatment facility of claim 9, wherein the second pipe is used as a mixing section for exhaust gas and introduced educt.

11. The exhaust gas treatment facility of claim 9, wherein the metering facility introduces the educt into the entry section of the second pipe.

12. The exhaust gas treatment facility of claim 1, wherein the longitudinal centre axes of the first pipe and the second pipe extend in parallel to each other.

13. An exhaust gas treatment facility for an exhaust gas system of a combustion engine, comprising:
   a housing having at least one inlet and at least one outlet;
   a first pipe is fastened on the housing in an entry section of the first pipe, the first pipe fixed with a sliding seat on the housing in an exit section of the first pipe;
   a second pipe, the entry of which is in fluid communication with an exit of the first pipe via a connecting chamber positioned adjacent the housing, wherein the second pipe is fixed on the housing with a sliding seat in an entry section of the second pipe, and the second pipe is fastened on the housing in an exit section of the second pipe without a sliding seat such that the exit section of the second pipe is fixedly attached to the housing; and
   wherein at least one of the sliding seats comprises a retaining pipe fixedly arranged or formed on the housing; and
   wherein the connecting chamber is formed by one or more shell bodies which are mounted on the exit section of the first pipe, and on the entry section of the second pipe;
   wherein both of the sliding seats are fixedly arranged or formed on the housing, and are arranged next to one another, such that the first pipe and the second pipe pass through a common wall of the housing and into the connecting chamber in a parallel arrangement; and
   further comprising a metering facility for injecting educt into the connecting chamber.

14. The exhaust gas treatment facility of claim 13, wherein the metering facility is arranged to inject educt into the connecting chamber at the entry section of the second pipe.

15. The exhaust gas treatment facility of claim 13, wherein the metering facility is arranged to inject educt into the connecting chamber upstream from the entry section of the second pipe.

16. The exhaust gas treatment facility of claim 13, wherein the first pipe contains at least one particle filter element.

17. The exhaust gas treatment facility of claim 13, wherein the first pipe contains at least one oxidation converter element.

18. The exhaust gas treatment facility of claim 13, wherein the first pipe has a radially removable axial section.

19. The exhaust gas treatment facility of claim 18, wherein the radially removable axial section contains at least one particle filter element.

20. The exhaust gas treatment facility of claim 13, wherein the at least one sliding seat that comprises a retaining pipe coaxially encloses the first or the second pipe, and a bearing material is coaxially arranged between the first or the second pipe and the retaining pipe, which the bearing material completely encloses the first or the second pipe in circumferential direction and which is supported radially on the first or the second pipe and radially and axially on the retaining pipe.

* * * * *